Feb. 1, 1966   G. HENRY ET AL   3,233,022
PROCESS FOR THE GRANULATION OF AGGLOMERABLE PULVEROUS MATERIALS
Filed March 20, 1962   2 Sheets-Sheet 1
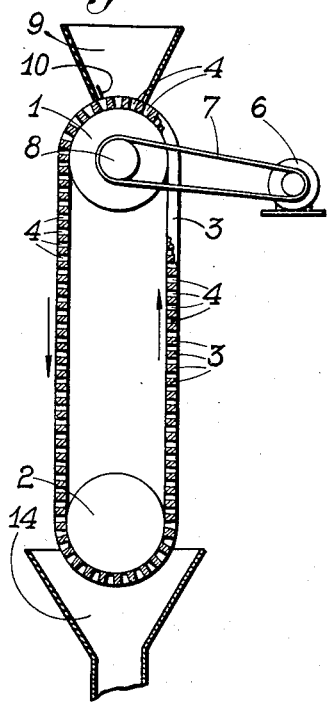
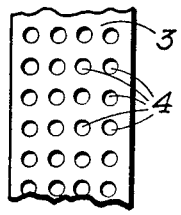
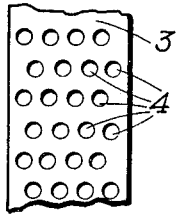
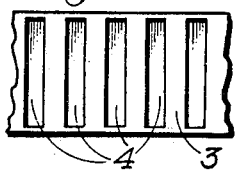
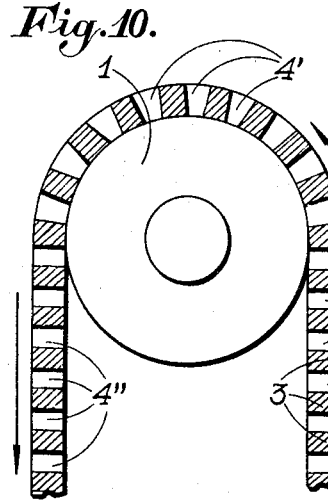
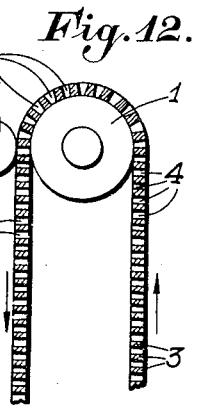
INVENTORS
GEORGES HENRY
EDGARD BRICHARD
BY Cores, Hart & Stample

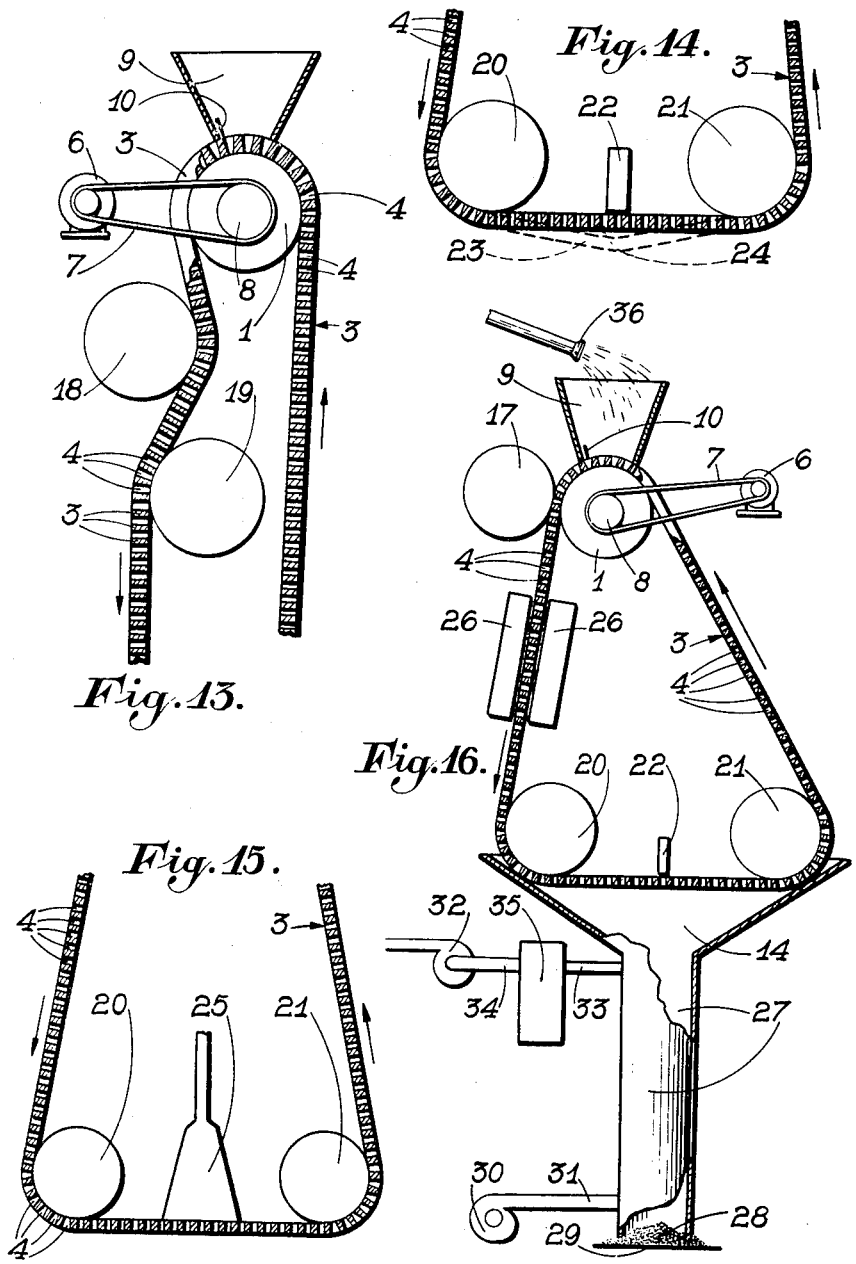

3,233,022
PROCESS FOR THE GRANULATION OF AGGLOMERABLE PULVEROUS MATERIALS
Georges Henry and Edgard Brichard, Jumet, Belgium, assignors to S. A. Glaverbel, Brussels, Belgium, a Belgian company
Filed Mar. 20, 1962, Ser. No. 181,074
Claims priority, application Belgium, Apr. 5, 1961, 479,379, Patent 602,240
8 Claims. (Cl. 264—123)

The present invention relates to a process for granulating plastic pulverous materials of moldable or other nature.

There are many fields of manufacture in which it is advantageous and even necessary to granulate not only finished products but also starting materials in order that they may be used, such as, for example, pulverous materials intended to be melted in furnaces.

The present invention is applicable regardless of the nature of the material or, in the case of pulverous material, regardless of whether the factor which permits agglomeration is, for example that the materials contain a binder which cements the grains together or that they contain, or there is added thereto, a salt which crystallises when the temperature is lowered or raised.

Apparatus for the granulation of such materials exist, but these have serious disadvantages. Some require high temperatures, while others require high pressures and are subjected to considerable abrasive actions. The abrasion is produced by the grains of the mixture to be granulated and it is increased by the high pressures under which these grains enter into contact with certain parts of the machine. This fact, combined with the considerable forces which are developed in order to obtain the necessary pressures, renders the apparatus very costly, because special, very hard alloys are employed and the parts are of considerable dimensions. To this is added a considerable expenditure of driving energy.

The process according to the present invention afford considerable advantages. They ensure continuous granulation without the application of high temperatures or pressures, the wear on the parts is reduced and they can be made of inexpensive materials, the consumption of energy being very low.

In accordance with the invention, there is exerted on an elastic cellular body a tension which opens the cells to permit the pulverous material to penetrate into them, the elastic body is thereafter allowed to return to its initial condition in order that the cells may close and that the material enclosed therein may be compressed, and a further tension is applied to the elastic body in order to reopen the cells and to allow the granules formed to escape.

In order to exert the tension on the elastic body and to stretch it, it is advantageously curved on a hard body. In this way, the lower side of the elastic body retains its own length, while the upper side becomes elongated, thus opening the cells into a hopper-like form. When the cells have been filled with pulverous material to be granulated, the tension exerted on the elastic body is relaxed, so that the total apparent volume of the pulverous material decreases and the material is subjected to a sufficient pressure to ensure granulation thereof. In order to facilitate the granulation, the elastic body is advantageously compressed in a direction perpendicular to the direction in which the tension is applied, so as to exert additional pressures on the material to be granulated.

By exerting a second tension on the elastic body, the volume of the cells is again increased and it is thus possible readily to ensure expulsion of the granules, because the latter only expand again to a negligible extent, and in any case to a much smaller extent than in the expansion of the cells. The expulsion of the granules is advantageously facilitated by subjecting the elastic body to vibrations or, in the case of cells in the form of apertures extending completely through the elastic body, by passing the latter over a compressed air blower.

Before the expulsion of the granules and while they are still compressed, they may be subjected to a heating or a cooling, depending upon which of these treatments is conducive to an increase in the cohesion of the material.

After their expulsion from the cells, the granules are separated from the fine particles of material which have not been granulated, for example by passing them through a gas current which carries away the fine particles. This separation may usefully be combined with a heating or cooling of the granules, for example by dropping them in counter-current to a current of hot or cold air.

A granulating apparatus comprises an endless belt of elastic material in which are formed cells, and drums on which the belt is mounted, the upper drum being the loading drum and the other, lower drum being a discharge drum. The cells may consist of holes drilled through the belt or of blind cavities. The cells may also have the form of transverse grooves obtained by adhesively securing rods or tubes on the belt or by the formation of furrows in the belt.

In passing over the loading drum, the cells in the belt become widened and filled with material to be granulated. In their rectilinear travel, the cells close and compress the material, thus converting it into granules which are expelled when the cells again open in passing over the discharge drum. Advantageously, instead of a single discharge drum being provided, the apparatus according to the invention comprises two drums, as also a device promoting the emptying of the cells, which acts on that portion of the belt which is situated between the said two drums. When the cells consist of blind cavities, or of transverse grooves, the said device is capable of jolting the belt at regular intervals, for example by means of a transverse percussion bar. When the cells extend entirely through the belt, this device is preferably adapted to project on to the belt a current of gas, which may be heated or cooled.

In order to increase the granulating effect, it may be desirable to dispose between the loading drum and the discharge drum two rollers which compress the belt whose cells are filled with material. One of the said two rollers may be one of the drums, preferably the loading drum. It is also possible to dispose in the path of the belt having full cells one or more drums imparting to the belt a curvature which is the inverse of that which it undergoes on the loading drum or successive curvatures of opposite directions, so as to assist the cells in returning to their initial form and to facilitate the formation of granules.

The cohesion between the particles of materials to be granulated may be increased by heating or by cooling, and it is therefore advantageous to provide in the path of the belt means having a thermal action, by which the material contained in the cells can be heated or cooled. Separate heating and cooling devices may be used, or single devices capable of producing heat or cold according to requirement.

Finally, in order to separate the granules from the fine particles of unagglomerated material, it is desirable to dispose below the discharge drum a separating device consisting, for example, of a column in which the material falls in counter-current to a current of hot or cold air which entrains the fine particles, while the grains fall to the bottom of the column.

A number of embodiments of the invention are illustrated by way of example in the accompanying drawings.

FIGURE 1 illustrates a form of the apparatus in its simplest construction.

FIGURES 2 to 9 illustrate various forms of the cells produced in the belt.

FIGURE 10 illustrates the behaviour of the cells as they pass over a drum.

FIGURES 11 to 15 illustrate a number of constructional variants of the apparatus.

FIGURE 16 illustrates a preferred constructional form of the apparatus.

In its simplest form as illustrated in FIGURE 1, the apparatus comprises a loading drum 1 and a discharge drum 2, over both of which there travels an endless belt 3 of elastic material, for example rubber, in which cells 4 are formed. The said cells may take various forms, some of which are illustrated in FIGURES 2 to 9. They may have, for example, a cylindrical, frustoconical or polygonal form, they may extend entirely through the belt or they may occupy only a part of the thickness thereof.

FIGURES 2 and 3 illustrate in section cylindrical and frustoconical cells respectively, extending entirely through the belt, and FIGURES 4 and 5 illustrate cavities of the same shape but not extending entirely through the thickness of the belt. These cells or cavities may be aligned in the belt as illustrated in FIGURE 6, or disposed quincuncially as illustrated in FIGURE 7. This arrangement is very advantageous in that it permits a better utilisation of the surface of the belt and a more uniform extension of the cells. These arrangements are indicated only by way of example and it is obvious that they may be combined and multiplied ad infinitum.

Instead of the above-described cells or cavities, the transverse grooves may be formed over all or part of the width of the belt. These grooves are obtained, for example, by grooving the belt as illustrated in plan view in FIGURE 8 or by soldering, welding or sticking webs or tubes 5 as illustrated in section in FIGURE 9. If the arrangement of grooves hollowed in the belt is adopted, the edge of the latter will preferably be left free from grooves in order that the mechanical strength of the belt may not be reduced. In the case of a grooved belt, there will obviously be obtained an agglomeration in the form of rods, but when they are discharged these rods will naturally become fragmented into substantially equiaxial granules. The grooves may be of rectangular or trapezoidal cross-section.

The cells or cavities of frustoconical form having a trapezoidal cross-section have the advantage of facilitating the discharge of the granules formed therein.

A motor 6 (FIGURE 1) drives through a chain or belt 7 and a pulley 8 the loading drum 1, which drives the belt 3 in the direction of the arrows. A variable-speed motor or an ordinary motor coupled to a variable-speed gear may with advantage be employed.

A hopper 9, whose lower orifice is situated against the belt 3, is fixed above the loading drum 1. The said hopper 9 contains the material to be granulated and comprises a scraping edge 10, which removes the surplus material deposited on the belt 3.

If the displacement of a cell is followed in FIGURE 10, it will first be seen in its normal form 4 in the course of its upward rectilinear movement. It thereafter passes over the loading drum 1, the curvature of which causes it to flare out as shown at 4'. Finally, as soon as the belt leaves the drum 1, the loaded cell returns approximately to its initial form at 4''. It is to be noted that this device gives rise to an increase in the volume of the cells 4, because if the belt 3 is folded in the absence of the drum 1 it is found that the fibres of the upper side of the belt will be lengthened, while the fibres of the lower side will be shortened. There will exist a neutral fibre whose length will be unchanged and which is, for example, mid-way between the two faces of the belt if the latter is symmetrical. In this case, therefore, the cells 4 retain the same volume; what they gain in volume on the upper side of the neutral fibre they lose on the lower side. On the other hand, if the belt is folded by driving it around a drum 1, the friction of the belt on the drum prevents variation in the length of the lower fibre; the latter therefore coincides with the neutral fibre and the belt is extended throughout its thickness. In practice, therefore, it will be advantageous to employ any means for increasing the friction between the drum 1 and the belt 3. For example, the drum 1 will be lined with a material having a high coefficient of friction in relation to the belt, such as a thin layer of metal oxide, for example alumina, or a rough metal coating, or again special products sold as adherents.

During the passage under the lower orifice of the hopper 9, the widened cells become filled with the material to be granulated and they then return to their normal form during their straight downward travel and compress the material which they contain. On arrival at the discharge drum 2, they open again and the granules thus freed fall into a receptacle or hopper 14 disposed below the said drum.

In order to increase the granulating effect, there may with advantage be provided two rollers 15 and 16 (FIGURE 11) which compress the belt 3 in its rectilinear travel after it has left the loading drum 1.

To the same end, there may be provided a roller 17 (FIGURE 12) which compresses the belt 3 between itself and the loading drum 1, when the cells have received the material to be granulated. The roller 17 will advantageously be placed as close as possible to the point at which the belt 3 leaves the drum 1 and at which the cells 4 have substantially returned to their initial shape.

In order to assist the cells to return to their initial shape and to promote the formation of granules, the belt 3 may usefully be caused, after having left the loading drum 1, to pass over one or more drums 18, 19 (FIGURE 13) so as to impart thereto successive curvatures in opposite directions.

FIGURES 14 and 15 illustrate two variants which have the object of facilitating the expulsion of granules from the cells 4.

According to FIGURE 14, instead of the discharge drum 2, there are provided two drums 20 and 21 between which the belt travels horizontally. Mid-way between these two rollers 20, 21 there is disposed against the upper face of the belt 3 a device 22 comprising a percussion hammer of known type which has the effect of imparting to the belt 3 a deformation which is represented by chain lines 23. The lowermost point 24 produces a further deflection of the belt which, in combination with the impact of the hammer, ensures expulsion of any granules which have not fallen during their passage over the drum 20.

In the apparatus illustrated in FIGURE 15, in the case of cells extending entirely through the belt, there is provided a diffuser 25 covering the entire width of the belt and blowing compressed air through the cells.

FIGURE 16 illustrates an installation comprising elements already described in the foregoing, as also a thermal device for heating or cooling the granules during their travel, and a device for separating the granules from the fine, unagglomerated particles.

Since the tendency of certain materials to agglomerate may be enhanced by heating or cooling, there are advantageously provided heating or cooling devices 26 of known type, between which the belt 3 passes after having left the loading drum 1. The heating devices may be, for example, electrical resistors or tubes through which a heated fluid is passed, and the cooling devices may be tubes through which a cooling fluid is passed. It is advantageous to provide in one installation heating and cooling devices or combined devices, for example tubes, which may be employed in either case by passing therethrough a heated fluid or a cooled fluid.

In order that the granules may not be mixed with non-agglomerated substance, a grading device is advantageously provided. For example, there will be disposed below the hopper 14 a column 27 through which the granules freely fall in order to form a bank 28 on the controlled-feed base 29 situated at the foot of the column 27.

The separation of the granules from the fine, unagglomerated particles of material can be readily effected by pneumatic means. For this purpose, there is disposed at the foot of the column 27 a fan 30 which blows into the latter a gas, for example air, through a duct 31. At the head of the column, a fan 32 sucks through ducts 33, 34 the same volume of air. The suction takes place through a dust extractor device 35, for example a cyclone.

Preferably, the fans 30 and 32 are so adjusted as to maintain a pressure which is substantially equal to atmospheric pressure at the head of the column 27 or slightly below this pressure. The blowing of dust out of the column is thus avoided. The atmosphere at the foot of the column is consequently at superatmospheric pressure and the controlled-feed base 29 forms a seal. During the descent of the granules and of the particles of material through the column 27, the speed of the air circulating in counter-current is sufficient to entrain the unagglomerated particles, but insufficient to entrain the granules. The separation is easier in proportion as the granules have a larger dimension in relation to the unagglomerated particles of material. The air blown through the column may be heated or cooled in order to supplement, if desired, the action of the heating or cooling elements 26.

Although a pneumatic grading is advantageous because it simultaneously ensures separation of the granules and cooling or heating thereof, it is obvious that the process of the invention may be combined with another method of grading. For example, the pneumatic separating device may be replaced by a screen.

The unagglomerated particles in the dust extractor 35 are thereafter re-introduced into the hopper 9, which may comprise a vaporiser 36 serving to moisten the material to be granulated, if necessary.

It is obvious that the invention is not limited to the embodiments which have been illustrated and described by way of example, and modifications may be made thereto without departing from its scope.

We claim:

1. A process for the granulation of an agglomerable pulverous material, comprising running an endless elastic belt over vertically spaced top and bottom cylindrical rollers, said belt being provided with a plurality of cavities opening outwardly from said belt, said cavities being widened at the outer surface of said belt when passing around said rollers and returning to normal when passing between said rollers, and feeding said pulverous material to said cavities in said widened condition when passing over said top roller, whereby said material is compressed to granules while passing between said rollers and escapes from said cavities while passing over said bottom roller.

2. The process of claim 1 wherein said elastic belt is vibrated in order to facilitate said escape of said granules.

3. The process of claim 1 wherein air is forced onto said elastic belt in order to facilitate said escape of said granules.

4. The process of claim 1 wherein said material is heated while in said cavities.

5. The process of claim 1 wherein said material is cooled while in said cavities.

6. The process of claim 1 wherein said escaped granules are separated from fine particles.

7. The process of claim 6 wherein said separation is combined with heating of said granules.

8. The process of claim 6 wherein said separation is combined with cooling of said granules.

References Cited by the Examiner

UNITED STATES PATENTS

| | | |
|---|---|---|
| 356,450 | 1/1887 | Coleman. |
| 1,751,430 | 3/1930 | Thomson _____ 264—162 |
| 1,803,408 | 5/1931 | Rouse _____ 25—99 |
| 2,938,230 | 5/1960 | Sainty _____ 18—1 XR |
| 3,005,420 | 10/1961 | Wiklund et al. _____ 25—99 XR |
| 3,057,012 | 10/1962 | Lufkin _____ 18—47.5 |
| 3,059,280 | 10/1962 | Laehder _____ 18—2.7 XR |
| 3,060,511 | 10/1962 | Parmella _____ 18—47.5 |

FOREIGN PATENTS

| | | |
|---|---|---|
| 514,721 | 12/1930 | Germany. |
| 426,203 | 3/1935 | Great Britain. |

ROBERT F. WHITE, *Primary Examiner.*

MORRIS LIEBMAN, M. R. DOWLING,
*Assistant Examiners.*